US011101939B2

United States Patent
Manepalli et al.

(10) Patent No.: US 11,101,939 B2
(45) Date of Patent: Aug. 24, 2021

(54) EFFICIENT SPARSE NETWORK RESOURCE USAGE AND CONNECTION RELEASE

(71) Applicant: Apple Inc., Cupertino, CA (US)

(72) Inventors: Venkateswara Rao Manepalli, Sunnyvale, CA (US); Sarma V. Vangala, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/802,310

(22) Filed: Feb. 26, 2020

(65) Prior Publication Data

US 2020/0195385 A1 Jun. 18, 2020

Related U.S. Application Data

(63) Continuation of application No. 16/153,910, filed on Oct. 8, 2018, now Pat. No. 10,601,552, which is a continuation of application No. 15/236,802, filed on Aug. 15, 2016, now Pat. No. 10,122,500.

(60) Provisional application No. 62/210,250, filed on Aug. 26, 2015.

(51) Int. Cl.
*H04L 1/18* (2006.01)
*H04W 76/30* (2018.01)
*H04W 76/38* (2018.01)

(52) U.S. Cl.
CPC .......... *H04L 1/1812* (2013.01); *H04L 1/1829* (2013.01); *H04W 76/30* (2018.02); *H04W 76/38* (2018.02)

(58) Field of Classification Search
None
See application file for complete search history.

(56) References Cited

U.S. PATENT DOCUMENTS

| 7,941,161 | B2 * | 5/2011 | Ioppe | H04W 4/029 |
| | | | | 455/456.3 |
| 8,959,180 | B1 * | 2/2015 | Huang | H04L 63/20 |
| | | | | 709/217 |
| 9,143,970 | B2 * | 9/2015 | Park | H04W 56/00 |
| 9,398,499 | B2 * | 7/2016 | Kim | H04W 36/14 |
| 9,642,123 | B2 | 5/2017 | Quan | |
| 9,681,403 | B2 * | 6/2017 | Yi | H04W 56/0005 |
| 9,736,727 | B2 * | 8/2017 | Nagasaka | H04W 28/08 |
| 9,781,763 | B2 | 10/2017 | Shen | |
| 9,826,509 | B2 | 11/2017 | Murakami | |
| 10,122,500 | B2 * | 11/2018 | Manepalli | H04L 1/1829 |
| 10,601,552 | B2 * | 3/2020 | Manepalli | H04L 1/1829 |

(Continued)

*Primary Examiner* — Bunjob Jaroenchonwanit
(74) *Attorney, Agent, or Firm* — Kowert, Hood, Munyon, Rankin & Goetzel, P.C.

(57) ABSTRACT

This disclosure relates to techniques for efficient sparse network resource usage and connection release procedures. According to some embodiments, a wireless device may utilize techniques for efficiently releasing a radio resource control (RRC) connection, including techniques that avoid or reduce the occurrence of random access procedures when out-of-sync with the network when the RRC connection is being released. In some embodiments, a wireless device may utilize techniques for efficiently sparsely using network uplink resources, including techniques that avoid or reduce the occurrence of random access procedures to regain timing alignment to perform uplink communication when out-of-sync with the network.

20 Claims, 8 Drawing Sheets

(56) References Cited

U.S. PATENT DOCUMENTS

| | | | |
|---|---|---|---|
| 2002/0072381 A1* | 6/2002 | Becker | H04B 7/2687 455/502 |
| 2003/0003895 A1 | 1/2003 | Wallentin | |
| 2003/0060235 A1 | 3/2003 | Yamato et al. | |
| 2007/0123266 A1* | 5/2007 | Polisetty | H04W 76/30 455/452.2 |
| 2007/0197252 A1 | 8/2007 | Watanabe | |
| 2009/0247203 A1* | 10/2009 | Kuo | H04W 76/28 455/509 |
| 2009/0270100 A1* | 10/2009 | Fukui | H04W 76/34 455/435.2 |
| 2009/0279495 A1* | 11/2009 | Yoo | H04L 5/0078 370/329 |
| 2009/0318152 A1 | 12/2009 | Maheshwari | |
| 2010/0027497 A1* | 2/2010 | Pelletier | H04W 28/06 370/329 |
| 2010/0061361 A1* | 3/2010 | Wu | H04W 56/0045 370/350 |
| 2010/0111058 A1 | 5/2010 | Fischer | |
| 2010/0195640 A1* | 8/2010 | Park | H04W 56/0005 370/350 |
| 2010/0272042 A1 | 10/2010 | Chun | |
| 2010/0279695 A1* | 11/2010 | Amirijoo | H04W 36/0055 455/438 |
| 2010/0322086 A1* | 12/2010 | Harris | H04L 1/1825 370/252 |
| 2011/0103499 A1* | 5/2011 | Cheng | H04W 56/0045 375/260 |
| 2011/0182224 A1* | 7/2011 | Ishii | H04W 56/005 370/311 |
| 2012/0176950 A1* | 7/2012 | Zhang | H04L 5/0098 370/311 |
| 2012/0178445 A1 | 7/2012 | Dalsgaard | |
| 2012/0208527 A1* | 8/2012 | Park | H04W 76/38 455/423 |
| 2013/0010712 A1* | 1/2013 | Kim | H04L 12/413 370/329 |
| 2013/0044696 A1 | 2/2013 | Dalal et al. | |
| 2013/0065525 A1* | 3/2013 | Kiukkonen | H04W 52/36 455/41.2 |
| 2013/0089062 A1 | 4/2013 | Ahn | |
| 2013/0163494 A1* | 6/2013 | Yu | H04W 72/042 370/311 |
| 2013/0194994 A1* | 8/2013 | Dayal | H04W 76/28 370/311 |
| 2013/0195049 A1* | 8/2013 | Yang | H04W 72/04 370/329 |
| 2013/0223365 A1 | 8/2013 | Choi | |
| 2013/0301468 A1* | 11/2013 | Lee | H04B 15/00 370/252 |
| 2013/0310057 A1* | 11/2013 | Tabet | H04W 76/25 455/450 |
| 2014/0003348 A1 | 1/2014 | Velev et al. | |
| 2014/0022974 A1* | 1/2014 | Eriksson | H04W 52/0254 370/311 |
| 2014/0064195 A1* | 3/2014 | Li | H04W 56/00 370/329 |
| 2014/0092800 A1 | 4/2014 | Cho | |
| 2014/0092855 A1* | 4/2014 | Ahn | H04W 74/006 370/329 |
| 2014/0119283 A1* | 5/2014 | Hwang | H04W 52/343 370/328 |
| 2014/0179318 A1* | 6/2014 | Wang | H04W 76/10 455/436 |
| 2014/0219184 A1 | 8/2014 | Makharia | |
| 2014/0235229 A1 | 8/2014 | Hwang | |
| 2014/0269637 A1* | 9/2014 | Banister | H04W 76/27 370/336 |
| 2014/0323180 A1* | 10/2014 | Uusitalo | H04W 68/12 455/553.1 |
| 2014/0376525 A1* | 12/2014 | Suzuki | H04W 56/0005 370/336 |
| 2015/0009816 A1 | 1/2015 | Hsu | |
| 2015/0009936 A1 | 1/2015 | Quan | |
| 2015/0043533 A1 | 2/2015 | Kim | |
| 2015/0055535 A1* | 2/2015 | Yu | H04W 52/0216 370/311 |
| 2015/0092542 A1* | 4/2015 | Yang | H04W 76/28 370/230 |
| 2015/0163810 A1 | 6/2015 | Chou | |
| 2015/0189689 A1* | 7/2015 | Wang | H04W 76/27 370/329 |
| 2015/0201454 A1* | 7/2015 | Shukair | H04W 76/25 370/329 |
| 2015/0201456 A1* | 7/2015 | Lee | H04W 72/042 370/311 |
| 2015/0245271 A1* | 8/2015 | Balasubramanian | H04W 72/10 455/437 |
| 2015/0282241 A1 | 10/2015 | Bergius et al. | |
| 2015/0282248 A1 | 10/2015 | Lee | |
| 2015/0296407 A1* | 10/2015 | Guo | H04W 72/1284 370/230 |
| 2015/0358865 A1 | 12/2015 | Fu | |
| 2015/0358875 A1* | 12/2015 | Kashikar | H04W 36/14 370/332 |
| 2016/0037450 A1 | 2/2016 | Richards | |
| 2016/0066290 A1* | 3/2016 | Cohen | H04W 56/0015 370/336 |
| 2016/0127968 A1 | 5/2016 | Velev | |
| 2016/0198457 A1* | 7/2016 | Chu | H04W 72/0413 370/329 |
| 2016/0212595 A1 | 7/2016 | Fukuta | |
| 2016/0212682 A1 | 7/2016 | Chung | |
| 2016/0277935 A1* | 9/2016 | Singh | H04W 16/14 |
| 2016/0277966 A1 | 9/2016 | Nagasaka | |
| 2016/0302194 A1* | 10/2016 | Sharma | H04W 56/0045 |
| 2016/0338141 A1* | 11/2016 | Tawashi | H04W 28/0278 |
| 2017/0006641 A1* | 1/2017 | Dinan | H04W 74/0833 |
| 2017/0048760 A1 | 2/2017 | Vajapeyam | |
| 2017/0064771 A1* | 3/2017 | Manepalli | H04W 76/30 |
| 2017/0094597 A1* | 3/2017 | Su | H04W 48/16 |
| 2017/0142741 A1* | 5/2017 | Kaur | H04W 72/02 |
| 2017/0150547 A1* | 5/2017 | Hedman | H04W 76/046 |
| 2017/0171852 A1* | 6/2017 | Bae | H04W 8/24 |
| 2017/0196025 A1* | 7/2017 | Chien | H04W 68/02 |
| 2017/0201898 A1* | 7/2017 | Park | H04W 72/0446 |
| 2017/0245213 A1 | 8/2017 | Martinez Tarradell | |
| 2017/0245318 A1* | 8/2017 | Rayavarapu | H04W 76/28 |
| 2017/0251447 A1* | 8/2017 | Wang | H04W 56/0005 |
| 2017/0257804 A1 | 9/2017 | Martinez Tarradell | |
| 2017/0265243 A1 | 9/2017 | Hahn | |
| 2017/0272932 A1 | 9/2017 | Barrett | |
| 2017/0366305 A1 | 12/2017 | Hwang | |
| 2018/0255607 A1* | 9/2018 | Nagaraja | H04L 5/0048 |
| 2018/0352567 A1* | 12/2018 | Ye | H04W 72/14 |
| 2019/0327750 A1* | 10/2019 | Hwang | H04L 1/1671 |
| 2020/0145887 A1* | 5/2020 | Rune | H04W 24/10 |

\* cited by examiner

| SR Configuration Index $I_{SR}$ | SR Periodicity (ms) $SR_{PERIODICITY}$ | SR subframe offset $N_{OFFSET, SR}$ |
|---|---|---|
| 0-4 | 5 | $I_{SR}$ |
| 5-14 | 10 | $I_{SR}-5$ |
| 15-34 | 20 | $I_{SR}-15$ |
| 35-74 | 40 | $I_{SR}-35$ |
| 75-154 | 80 | $I_{SR}-75$ |
| 155-156 | 2 | $I_{SR}-155$ |
| 157 | 1 | $I_{SR}-157$ |

EFFICIENT SPARSE NETWORK RESOURCE USAGE AND CONNECTION RELEASE

PRIORITY INFORMATION

This application is a continuation of U.S. patent application Ser. No. 16/153,910, entitled "Efficient Sparse Network Resource Usage and Connection Release," filed Oct. 8, 2018, which is a continuation of U.S. patent application Ser. No. 15/236,802, entitled "Efficient Sparse Network Resource Usage and Connection Release," filed Aug. 15, 2016, which claims priority to U.S. provisional patent application Ser. No. 62/210,250, entitled "Efficient Sparse Network Resource Usage and Connection Release," filed Aug. 26, 2015, which are all hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, including to apparatuses, systems and methods for efficient sparse network resource usage and connection release.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Cellular communication technologies may be capable of providing a variety of services, and may be used by a variety of applications. Different applications utilizing cellular communication may have different characteristics. Cellular communication techniques which do not take into account the different application characteristics of the various applications utilizing cellular communication may operate inefficiently. Accordingly, improvements in the field would be desirable.

SUMMARY

Embodiments are presented herein of apparatuses, systems, and methods for efficient sparse network resource usage and connection release of wireless devices.

According to some embodiments described herein, a wireless device may implement techniques that avoid or reduce the need to perform random access procedures when releasing a radio resource control (RRC) connection. For example, techniques are described herein for releasing the RRC connection of a wireless device without requiring the wireless device to provide any acknowledgement in response to an indication (e.g., an RRC connection release message or a specially designated paging message) to release the RRC connection. Techniques are also provided for a wireless device to release the RRC connection without receiving any indication to release the RRC connection from the network, e.g., by utilizing a local RRC connection release timer synchronized with a network-side RRC connection release timer. Still further techniques are provided for a wireless device to provide acknowledgement in response to an indication from the network to release the RRC connection, in which the network assists the wireless device to reduce the number of random access procedures needed to complete the RRC connection release by providing uplink resources (e.g., scheduling request resources, sounding reference signal resources, an uplink grant, etc.).

Additionally or alternatively, according to some embodiments described herein, a wireless device may implement techniques that avoid or reduce the need to perform random access procedures when sparsely utilizing uplink resources. For example, techniques are described herein for a wireless device to use previously received timing alignment information to request uplink resources and perform uplink communication even after its timing alignment timer has expired (e.g., if the wireless device has been relatively stationary such that the timing alignment information is reasonably likely to still be functional). According to some embodiments, the wireless device may retain and use scheduling request resources to request the uplink resources for the uplink communication after the timing alignment timer has expired, e.g., rather than releasing those resources upon expiration of the timing alignment timer. Additionally or alternatively, the network may (e.g., if it is expecting the wireless device to sparsely use uplink network resources) occasionally provide uplink grants to the wireless device even after expiration of the timing alignment timer.

The techniques described herein may be implemented in and/or used with a number of different types of devices, including but not limited to cellular phones, cellular base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
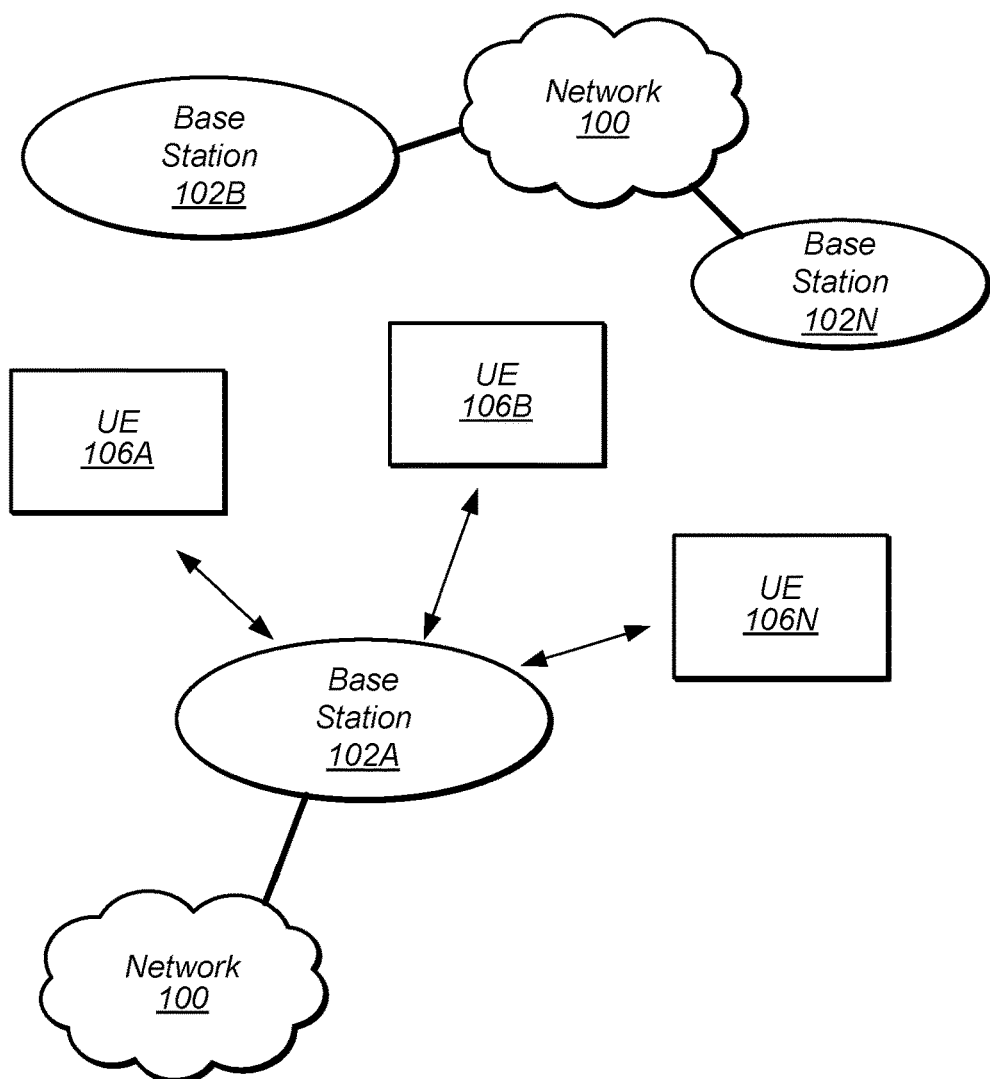
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial Radio Access Network
LTE: Long Term Evolution
RAN: Radio Access Network
E-UTRAN: Evolved UMTS Radio Access Network or Evolved Universal Radio Access Network
EPC: Evolved Packet Core
EPS: Evolved Packet Service
MME: Mobility Management Entity
HSS: Home Subscriber Server
AS: Access Stratum
NAS: Non-Access Stratum
RLC: Radio Link Control
RRC: Radio Resource Control
MAC: Media Access Control
IE: Information Element
NW: Network Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
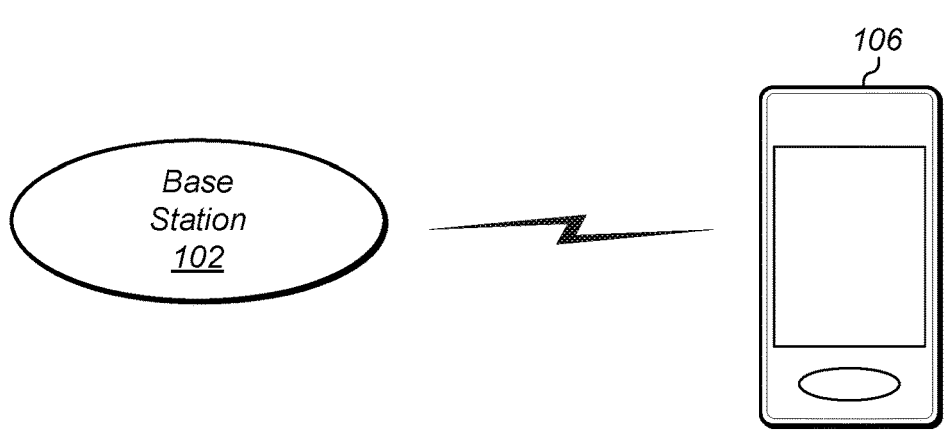
FIG. 2 illustrates a base station (BS) in communication with a user equipment (UE) device, according to some embodiments.
Figure 3:
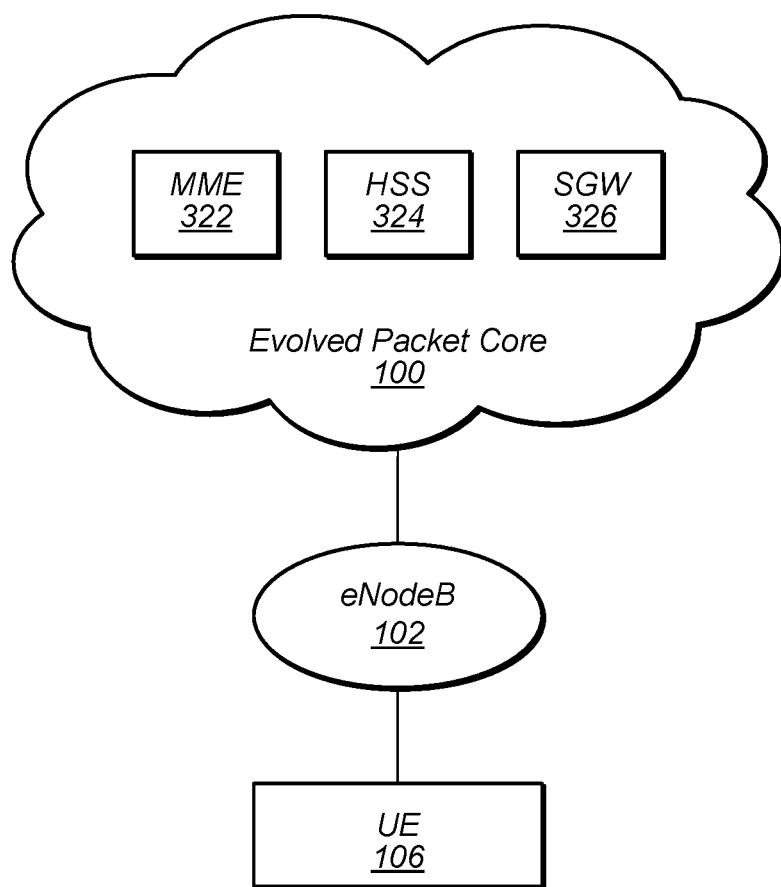
FIG. 3 illustrates an exemplary (and simplified) cellular network architecture, according to some embodiments.

FIGS. 1-3—Communication System

FIG. 1 illustrates an exemplary (and simplified) wireless communication system in which aspects of this disclosure may be implemented, according to some embodiments. For example, any or all of the wireless devices illustrated in FIG. 1 may be configured for efficient sparse network usage and/or connection release, e.g., according to the methods of FIGS. 7-8. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware and/or software that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, NEV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 7:
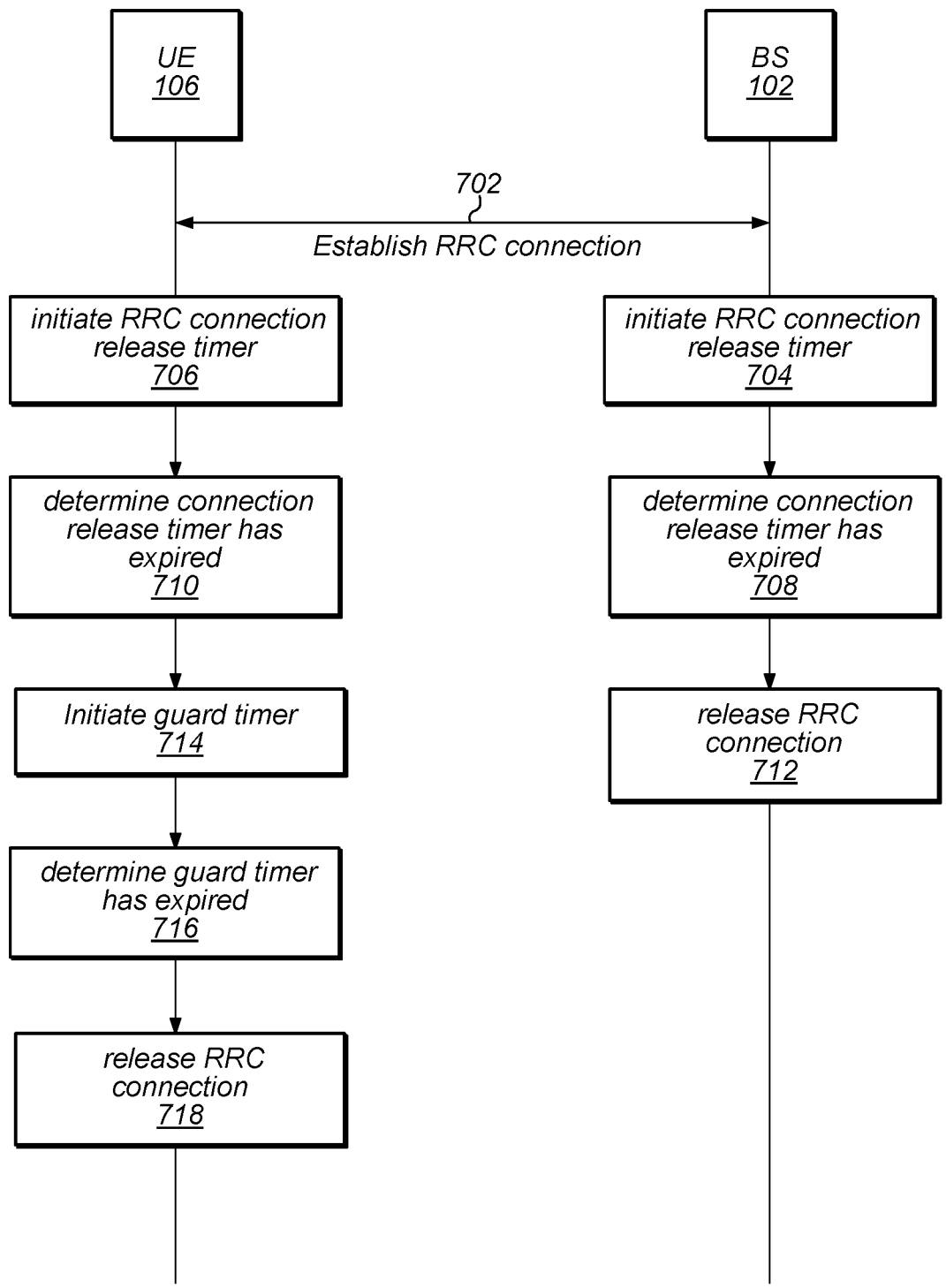
FIG. 7 is a communication flow diagram illustrating an exemplary method for efficiently releasing RRC connections between wireless devices and base stations, according to some embodiments.
Figure 8:
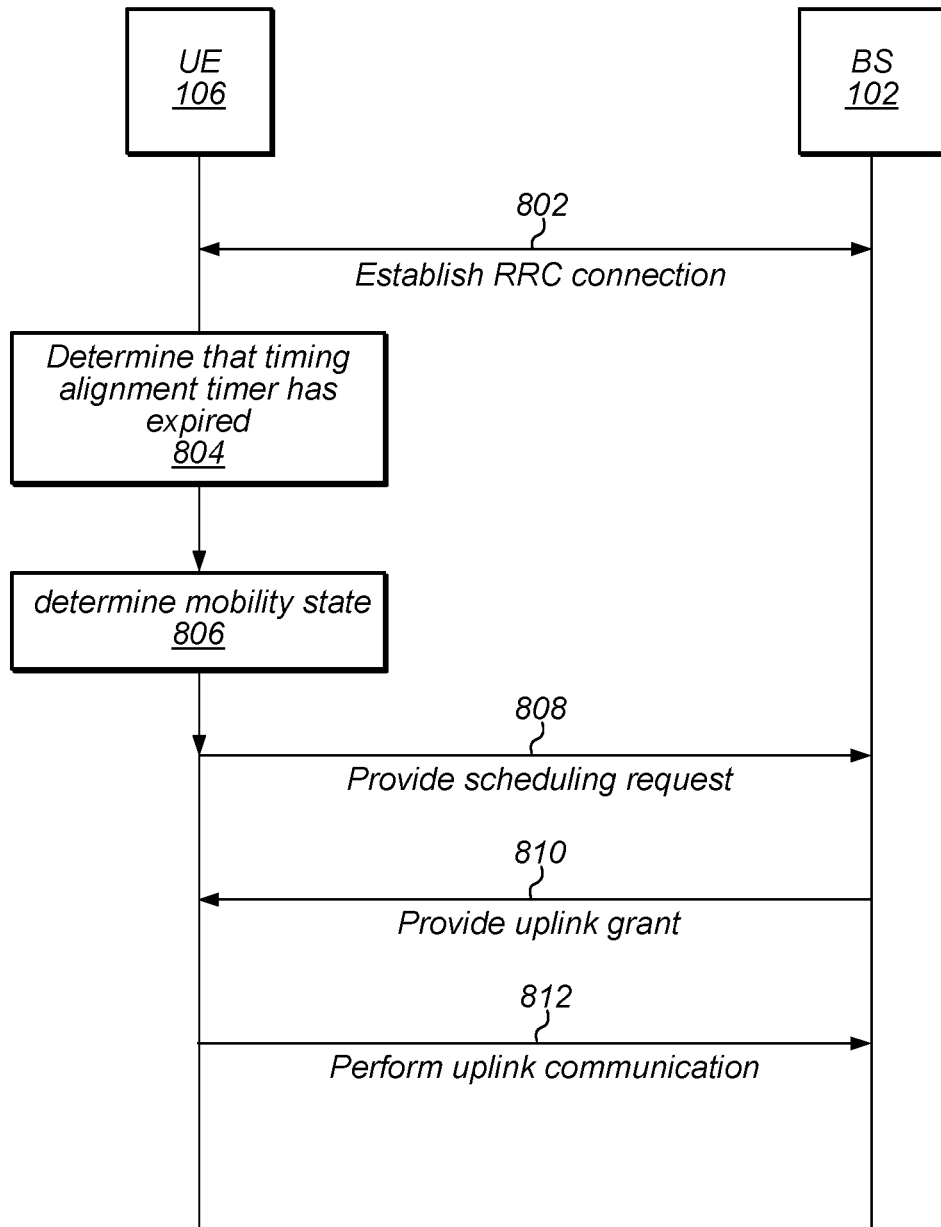
FIG. 8 is a communication flow diagram illustrating an exemplary method for efficient sparse uplink resource usage, according to some embodiments.

FIG. 3 illustrates an exemplary, simplified portion of a wireless communication system in which aspects of this disclosure, including techniques for efficient sparse network usage and/or connection release such as according to the methods of FIGS. 7-8, may be implemented. The wireless communication system of FIG. 3 may be illustrative of a portion of a 3GPP compliant cellular network, according to some embodiments.

As shown, a UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices and/or entities known to those skilled in the art as well.

Figure 4:
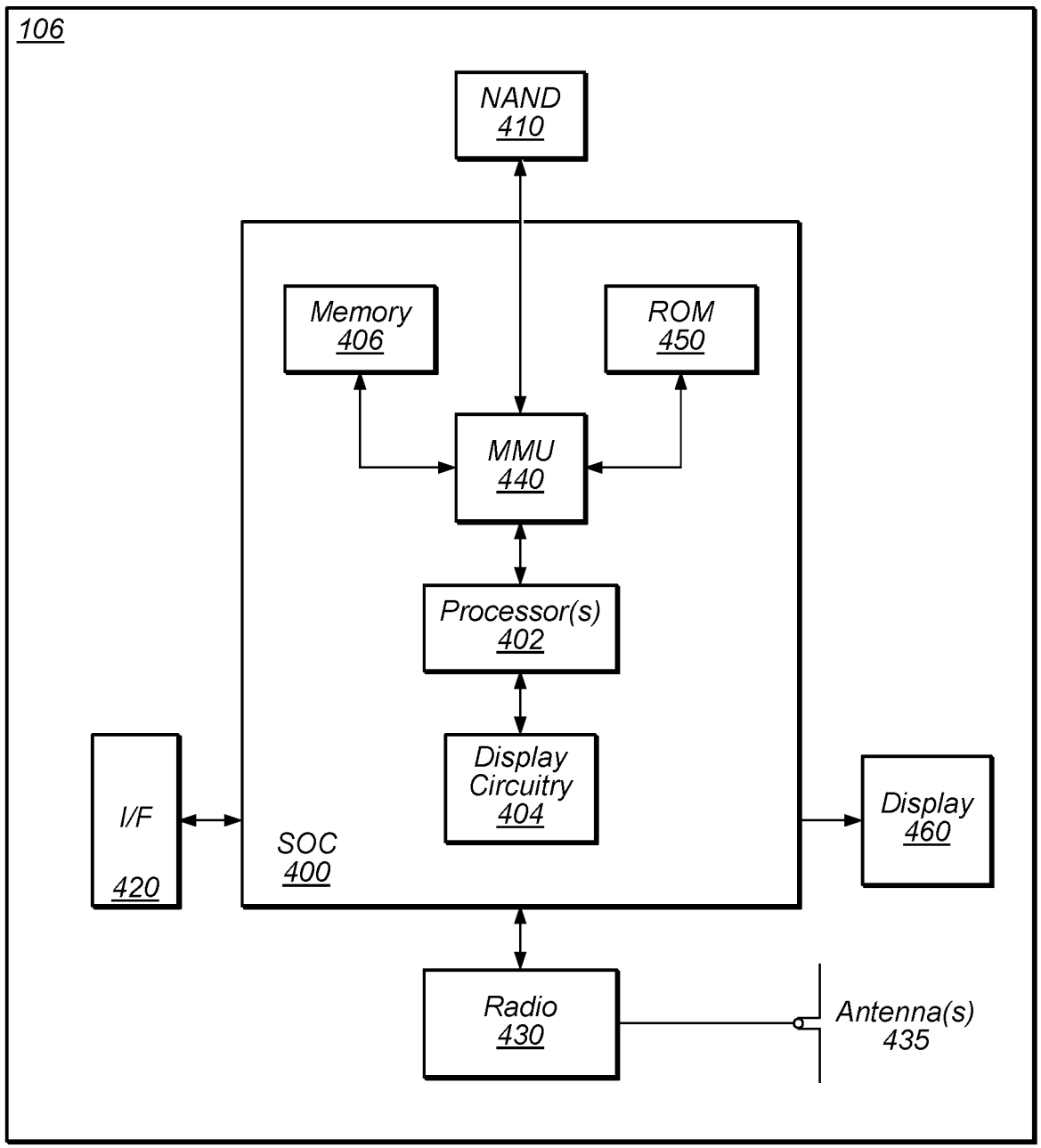
FIG. 4 illustrates an exemplary block diagram of a UE, according to some embodiments.

FIG. 4—Exemplary Block Diagram of a UE

FIG. 4 illustrates an exemplary block diagram of a UE 106, according to some embodiments. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, Wi-Fi, etc.).

As noted above, the UE 106 may be configured to communicate wirelessly using multiple wireless communication technologies. As further noted above, in such instances, the wireless communication circuitry 430 may include radio components that are shared between multiple wireless communication technologies and/or radio components that are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 435 to perform the wireless communication.

As described further subsequently herein, the UE 106 may include hardware and software components for implementing part or all of the methods described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
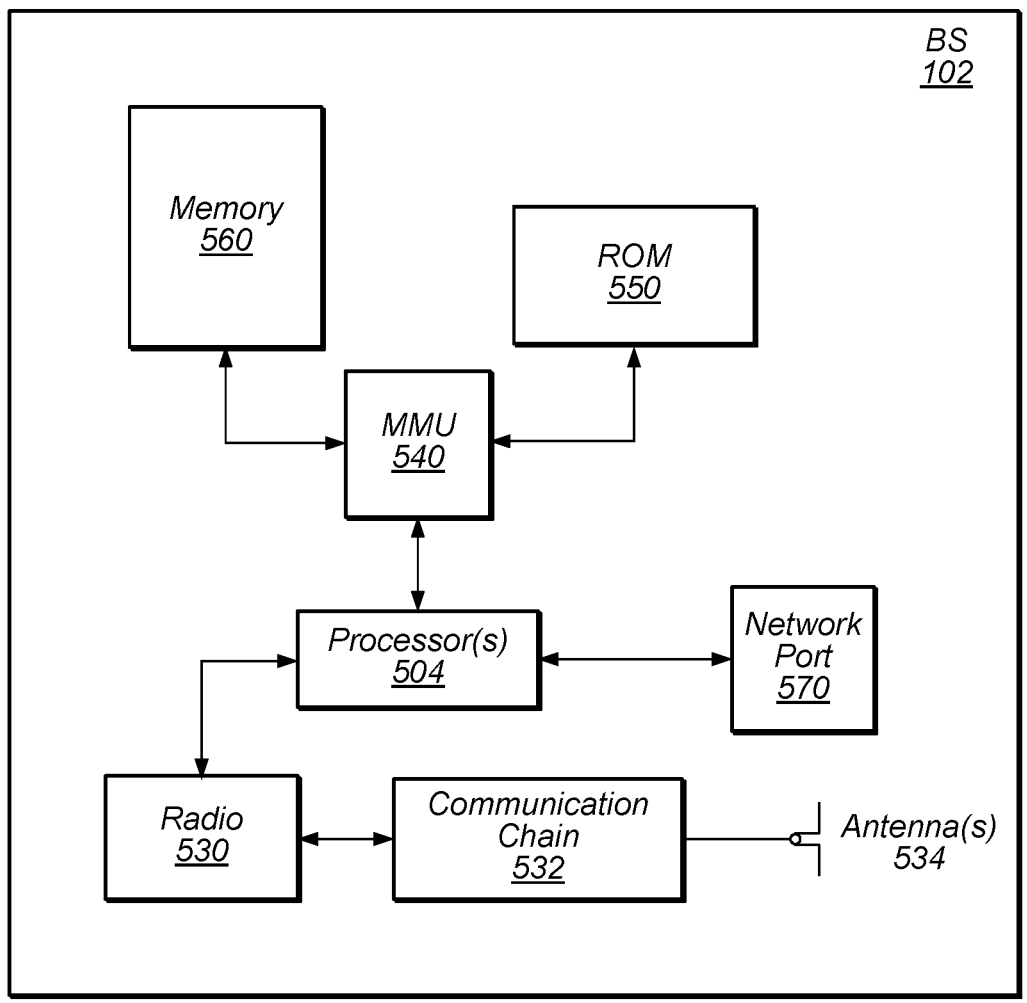
FIG. 5 illustrates an exemplary block diagram of a BS, according to some embodiments.

FIG. 5—Base Station

FIG. 5 illustrates an exemplary block diagram of a base station 102, according to some embodiments. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534, and possibly multiple antennas. The antenna(s) 534 may be configured to operate as a wireless transceiver and may be further configured to communicate with UE devices 106 via radio 530. The antenna(s) 534 communicates with the radio 530 via communication chain 532. Communication chain 532 may be a receive chain, a transmit chain or both. The radio 530 may be configured to communicate via various wireless communication technologies, including, but not limited to, LTE, LTE-A, GSM, WCDMA, CDMA2000, Wi-Fi, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
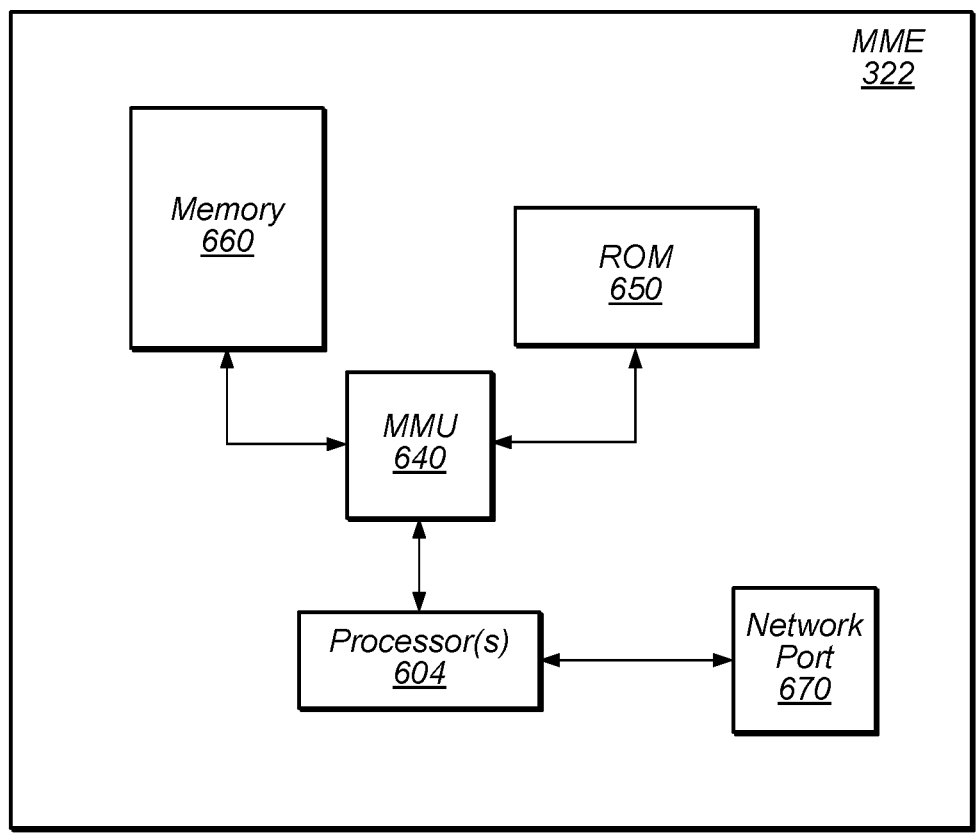
FIG. 6 illustrates an exemplary block diagram of an MME, according to some embodiments.

FIG. 6—Mobility Management Entity

FIG. 6 illustrates an exemplary block diagram of a mobility management entity (MME) 322, according to some embodiments. It is noted that the MME 322 of FIG. 6 is merely one example of a possible MME 322. As shown, the MME 322 may include processor(s) 604 which may execute program instructions for the MME 322. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The MME 322 may include at least one network port 670. The network port 670 may be configured to couple to one or more base stations and/or other cellular core network entities and/or devices.

The MME 322 may provide mobility related services to a plurality of devices, such as UE devices 106. For example, the MME 322 may be responsible for registering UE devices which attempt to perform an attach procedure, a tracking area update procedure, and/or any of various other procedures.

The MME 322 may communicate with base stations (e.g., eNBs) and/or other core network entities/devices by means of any of various communication protocols and/or interfaces. As one example, in a 3GPP context, the MME 322 may use any of an S1-MME, S3, S10, S11, S6a, and/or any of various other communication protocols or interfaces to communicate with other cellular network components.

The processor(s) 604 of the MME 322 may be configured to implement part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

FIG. 7—Efficient Connection Release

In LTE, a UE may be able to operate in one of the two modes, an idle mode and a connected mode. In the idle mode, Discontinuous Reception (DRX) allows the UE to switch off its radio receiver and thereby reduce its power consumption. At least in some embodiments, it may be the case that a UE enters the idle mode upon receiving a Radio Resource Control (RRC) connection release message from the network. In the connected mode a UE can be in active data transmission or in a connected DRX mode. The connected mode DRX pattern may, for example, be used by the UE if configured by the network, and may follow a defined pattern of on and off cycles. DRX can be configured using any of a variety of settings, and at least in some instances multiple DRX modes (e.g., a short DRX or a long DRX) may be configured as desired.

At least in some instances, a UE may be in an out-of-sync state when the network tries (e.g., as a result of an inactivity timer expiring) to release the RRC connection of the UE. In such a case, the UE might be expected to regain synchronization with its serving base station just to receive the RRC connection release message and respond with a L2 acknowledgement to the RRC connection release message. This may represent a substantial amount of power consumption. Accordingly, more efficient techniques for releasing RRC connections could potentially reduce the power consumption of wireless devices.

FIG. 7 is a communication/signal flow diagram illustrating one such scheme for efficiently releasing RRC connections between wireless devices and base stations, according to some embodiments. The scheme shown in FIG. 7 may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

In 702, a UE 106 and a BS 102 may establish an RRC connection. This may be scheduled in advance or unscheduled. The UE 106 may perform a random access channel (RACH) procedure in order to establish the RRC connection. Alternatively, the BS 102 may page the UE 106 at a scheduled time, and the UE 106 may respond to the paging message and exchange RRC connection establishment parameters with the BS 102 to establish the scheduled RRC connection.

Certain configuration information may be exchanged as part of the RRC connection establishment procedure, at least in some embodiments. Such information may include timing alignment information, connection release procedures and/or parameters, and/or any of various other types of information.

In 704, the BS 102 may initiate a RRC connection release timer. The connection release timer may be used by the BS 102 to determine when to release the RRC connection with the UE 106.

In 706, the UE 106 may also initiate a RRC connection release timer. The connection release timer at the UE 106 may be used by the UE 106 to determine when to release the RRC connection with the BS 102.

The RRC connection release timers may by synchronized such that the connection release timer of the UE 106 and the connection release timer of the BS 102 expire at the same time. This may be achieved by way of dynamically exchanged configuration information (e.g., on a per-RRC connection basis), or according to a static configuration (e.g., according to standards documents and/or mutual agreement between device makers and infrastructure vendors), as desired. As examples of parameters that may be used to synchronize the connection release timers, each of the UE 106 and the BS 102 may have synchronized base lengths and may re-set or re-start the connection release timer upon certain events (e.g., data communication events) occurring in a synchronized manner.

In 708 and 710, the BS 102 and the UE 106 may each respectively determine that its connection release timer has expired. Since the connection release timers may be synchronized, these determinations may be made simultaneously or approximately simultaneously (e.g., during the same subframe).

In 712, the BS 102 may release the RRC connection with the UE 106 based on determining that the RRC connection release timer has expired.

In 714, the UE 106 may initiate a guard timer based on determining that the RRC connection release timer has expired. The UE 106 may delay releasing the RRC connection until after the BS 102 has released the RRC connection by way of the guard timer, for example in order to avoid race conditions.

In 716, the UE 106 may determine that the guard timer has expired, and in 718, based on determining that the guard timer has expired, the UE 106 may also release the RRC connection.

Since the UE 106 and the BS 102 may each independently (though in a synchronized manner) track when to release the RRC connection, this may obviate the need for explicit RRC connection release messages and acknowledgements between the UE 106 and the BS 102, at least in some instances. This may be particularly useful if the UE 106 is in an out-of-sync state (e.g., has an expired timing alignment timer) when the RRC connection is released, since in such a circumstance, the UE 106 might be required to perform two RACH procedures in short order (e.g., to obtain timing alignment and to transmit the acknowledgement) in order to be able to provide a radio link control (RLC) level acknowledgement to an RRC connection release message.

Alternatively, the UE 106 and the BS 102 may utilize one or more other techniques for enabling implicit (or partially implicit) RRC connection release between a UE 106 and a BS 102, and/or for reducing the RACH procedure burden on the UE 106 to complete a RRC connection release when in an out-of-sync state. For example, consider the following possibilities, in which (at least according to some embodiments) the UE 106 may not utilize a RRC connection release timer.

As one example, the BS 102 may provide an indication to release an RRC connection to the UE 106 by way of a paging message. At least in some embodiments, in this case the UE 106 and the BS 102 may each release the RRC connection without any further message exchange, e.g., including RLC or hybrid automatic repeat request (HARQ) acknowledgements.

Note that in such a case the UE 106 may be identified by its cell radio network temporary identifier (C-RNTI) or system architecture evolution (SAE) temporary mobile subscriber identifier (S-TMSI) with the paging cause set to connection release. Note also that this technique may also allow a BS 102 to release multiple UEs RRC connections at the same time, at least in some embodiments.

As another example, the BS 102 may provide a RRC connection release message to the UE 106 upon expiration of the RRC connection release timer at the BS 102. At least in some embodiments, in this case the UE 106 and the BS 102 may each release the RRC connection without any further message exchange, e.g., including RLC or HARQ acknowledgements.

As yet another example, if the UE 106 is out-of-sync with the BS 102, the BS 102 may indicate to the UE 106 to perform a RACH procedure (e.g., to gain timing alignment), for example by way of a PDCCH order. Such a RACH procedure may be contention-based or contention-free. Once the UE 106 is in-sync (e.g., as a result of the RACH), the base station 102 may provide a RRC connection release message and provide an uplink grant (e.g., associated with the RRC connection release message) at an offset from the RRC connection release message. The UE 106 may use this uplink grant to provide a RLC acknowledgement message (e.g., instead of performing a RACH procedure again for receiving an uplink grant with which to provide the RLC acknowledgement message) in response to the RRC connection release message.

As a further example, if the UE 106 is out-of-sync with the BS 102, the BS 102 may indicate to the UE 106 to perform a RACH procedure (e.g., to gain timing alignment), for example by way of a PDCCH order. Such a RACH procedure may be contention-based or contention-free. Once the UE 106 is in-sync (e.g., as a result of the RACH), the base station 102 may provide a RRC connection release message and provide scheduling request (SR) resources (e.g., obviating the need for the UE 106 to perform another RACH procedure). The UE 106 may use these SR resources to request an uplink grant. The BS 102 may provide the requested uplink grant, which the UE 106 may use to provide a RLC acknowledgement message in response to the RRC connection release message.

As a still further example, if the UE 106 is out-of-sync with the BS 102, the BS 102 may indicate to the UE 106 to perform a RACH procedure (e.g., to gain timing alignment), for example by way of a PDCCH order. Such a RACH procedure may be contention-based or contention-free. Once the UE 106 is in-sync (e.g., as a result of the RACH), the base station 102 may provide a RRC connection release message. The UE 106 may respond to the RRC connection release message with an uplink hybrid automatic repeat request (HARQ) acknowledgement message. Based on the HARQ acknowledgement, the BS 102 may be able to determine (e.g., by passing information up to the RLC layer) that the UE 106 has received the RRC connection release message, and each side may complete the RRC connection release procedure without the UE 106 providing a RLC layer acknowledgement to the BS 102.

As another example, if the UE 106 is out-of-sync with the BS 102, the BS 102 may provide a RRC connection release message, and may provide sounding reference signal (SRS) resources to the UE 106. The UE 106 may transmit SRS using the SRS resources, based on which the BS 102 may be able to determine a timing adjustment for the UE 106. The BS 102 may provide a timing alignment command (TAC) to the UE 106 including a timing alignment value (e.g., the determined timing adjustment). The BS 102 may further provide an uplink grant, which the UE 106 may use to provide a RLC acknowledgement message in response to the RRC connection release message.

Note that such techniques may be used in association with certain features or groups of features, or may be implemented more generally, as desired. For example, any of the above-described techniques for efficient RRC connection release may be used (e.g., activated) in conjunction with a feature or group of features associated with the cellular network being aware of one or more active applications and/or types of active applications of the UE device, e.g., an 'application aware' configuration.

FIG. 8—Efficient Sparse Network Resource Usage

There are many communication scenarios in which a wireless device may perform wireless communication regularly but relatively infrequently. For example, periodic communication of measurement data by a measurement device (or a communication device coupled to a measurement device) might occur regularly but relatively infrequently. Other application types and communication types may also utilize network resources sparsely. Commonly, devices performing such types of communication may also be relatively low power and/or low complexity devices, for which efficient operation may be of particular importance. Accordingly, techniques for improving the efficiency of network communication that occurs relatively infrequently may be desirable at least for such devices, at least according to some embodiments.

FIG. 8 is a communication/signal flow diagram illustrating one such scheme for efficient sparse uplink resource usage by a wireless device in communication with a base station of a cellular network, according to some embodiments. The scheme shown in FIG. 8 may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

In 802, a UE 106 and a BS 102 may establish an RRC connection. This may be scheduled in advance or unscheduled. The UE 106 may perform a random access (RACH) procedure in order to establish the RRC connection. Alternatively, the BS 102 may page the UE 106 at a scheduled time, and the UE 106 may respond to the paging message and exchange RRC connection establishment parameters with the BS 102 to establish the scheduled RRC connection.

Certain configuration information may be exchanged as part of the RRC connection establishment procedure, at least in some embodiments. Such information may include timing alignment information, connection release procedures and/or parameters, and/or any of various other types of information. Thus, the UE 106 may receive initial timing alignment information during the RRC connection establishment procedure. The UE 106 may also receive timing alignment information from the BS 102 at other times, e.g., according to a periodic schedule while in an RRC connected state.

In 804, the UE 106 may determine that a timing alignment timer of the UE 106 has expired. This may occur, in some instances, if a radio link between the UE 106 and the BS 102 is poor. As another possibility, this may occur if the BS 102 has stopped sending timing alignment commands, for example because the UE 106 is communicating with the BS 102 infrequently.

In 806, the UE 106 may determine a mobility state of the UE device. For example, the UE 106 may determine whether the UE 106 is 'mobile' or 'stationary'. Other mobility states (e.g., 'semi-stationary', 'semi-mobile', etc.) are also possible. The mobility state of the UE 106 may be determined based on any of various mobility indicators, including radio condition based indicators (e.g., using signal strength, signal quality, and/or other metrics relating to the serving base station, neighboring base stations, etc.), internal device based indicators (e.g., using motion detection device circuitry, such as gyroscope(s), accelerometer(s), and/or other sensing components), etc. Note that the mobility state of the UE 106 may be associated with any of various time windows. For example, the mobility state of the UE 106 may be an instantaneous mobility state based on current conditions. As another possibility, the mobility state may be based on (average, total, or other measure of) an amount of motion over a period of time, such as a period of time since a timing alignment command was most recently received.

In some embodiments, if the UE 106 is in a first mobility state (e.g., associated with stationary or semi-stationary status), the UE 106 may determine that it can continue to use the most recent timing alignment information for uplink communications even after the timing alignment timer has expired. If the UE 106 is in a second mobility state (e.g., associated with mobile status), the UE 106 may determine not to continue to use the most recent timing alignment information for uplink communications after the timing alignment timer has expired, and instead to perform a RACH procedure to regain network timing synchronization if further uplink communication is desired after the timing alignment timer has expired.

In some embodiments, the UE 106 may retain (e.g., instead of releasing) its previously allocated SR resources after the timing alignment timer has expired. In this case (and possibly depending on the mobility state of the UE 106), in 808 the UE 106 may use such SR resources to send a scheduling request to the BS 102. For example, the UE 106 may send such a SR if it has data in its uplink buffer (e.g., in which case the UE 106 may have a buffer status report to send). The UE 106 may use previously received (e.g., most recent) timing alignment information to send the SR.

Since the UE 106 may have been relatively stationary since most recently receiving timing alignment information, the timing alignment of the SR may be sufficiently accurate that the BS 102 is able to successfully receive and decode the SR. Accordingly, in 810, the BS 102 may provide an uplink grant to the UE 106 in response to the SR.

In 812, the UE 106 may perform uplink communication using the uplink grant provided by the BS 102. The uplink communication may also use the previously received timing alignment information.

As another possibility (e.g., instead of or in addition to allowing the UE 106 to retain SR resources after the timing alignment timer expires), the BS 102 may occasionally (e.g., periodically, such as for each C-DRX on-duration) provide uplink grants to the UE 106 after the timing alignment timer expires. This may free the SR/PUCCH resources of the network that were allocated to the UE 106 while still allowing a mechanism for the UE 106 to perform uplink communication using previously received timing alignment information after the timing alignment timer expires.

Such techniques may be useful (among various possible scenarios) when a UE 106 sparsely uses network resources. For example, such techniques may be used in conjunction with relatively long C-DRX cycles (e.g., 640 ms, 1.28s), with minimal SR allocations (e.g., 1 SR per C-DRX cycle, 2 SRs per C-DRX cycle, 1 SR every other C-DRX cycle, or any other desired allocation). In such cases, a UE 106 may be able to perform occasional network communication with fewer PUCCH/SR procedures than might otherwise be required to maintain timing alignment, and/or to avoid excessive RACH procedures while being connected and transitioning between UL In sync phase and Out of Sync Phases.

Figures 9, 10:
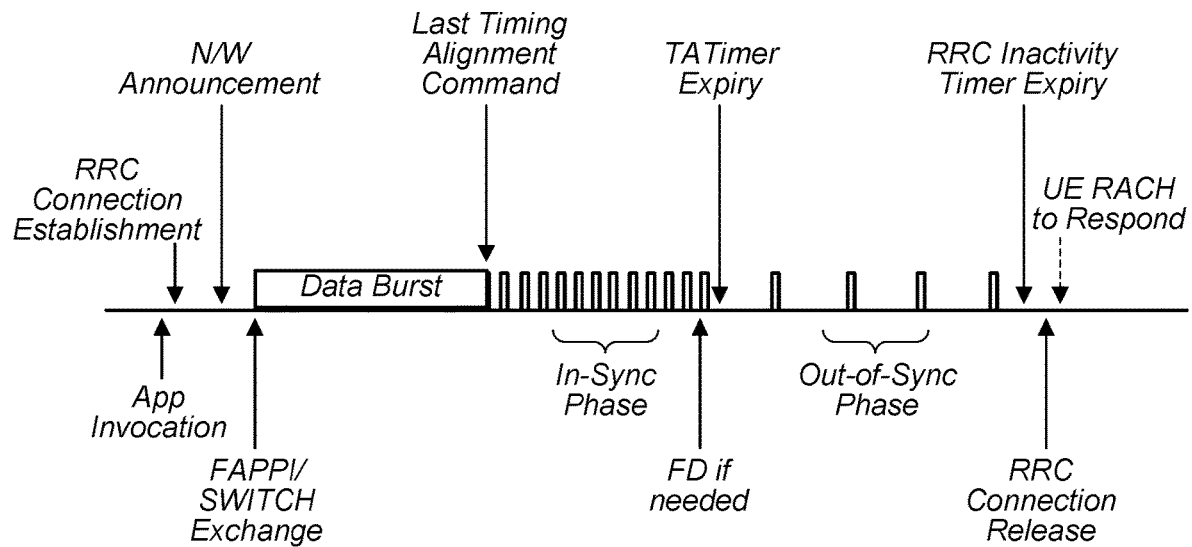
FIG. 9 illustrates exemplary events and phases of communication between a wireless device and a network, according to some embodiments.
FIG. 10 is a table illustrating examples of possible scheduling request configuration options, according to some embodiments.

FIGS. 9-10—Additional Information

FIGS. 9-10 and the additional description provided herein below in conjunction therewith are provided as being illustrative of further considerations and possible implementation details of the methods of FIGS. 7-8, and are not intended to be limiting to the disclosure as a whole. Numerous variations and alternatives to the details provided herein below are possible and should be considered within the scope of the disclosure.

In certain circumstances, such as (at least according to some embodiments) when operating in conjunction with application aware network features, a device may transition between uplink (UL) out-of-sync (OOS) and UL in-sync (INS) while remaining in an RRC connected state.

While such a device moves between UL OOS and UL INS, its C-DRX cycle may be modified for power gains (e.g., power consumption reduction). The INS and OOS transition may be controlled by the Timing Alignment Timer (TAT).

Due to INS and OOS transitions, while the inactivity timer in the NW is about to expire, the UE might be in the OOS state. The NW may try to release the RRC connection at inactivity timer expiry. To perform this RRC connection Release, the NW may generally send a RRC Connection Release Request to the UE and the UE may be expected to respond with a L2 (e.g., RLC) ACK for the release request message.

However, if the UE is in the OOS state, NW may not be able to directly send the message unless it triggers a RACH (e.g., using a PDCCH Order) and the UE transitions back to INS.

Once the UE transitions to the INS state, the UE may trigger one more RACH, as it may not have the UL resources to send a UL RLC ACK in response to the connection release message.

Because of this behavior there can be two RACHs for a connection release that happens while the UE is UL OOS. This may result in substantial power consumption.

FIG. 9 illustrates such a possible network communication sequence in which multiple RACHs are used to complete a RRC connection release when the UE is in the OOS state.

A variety of alternative RRC connection release arrangements that reduce or eliminate the need to RACH to complete the RRC connection release when the UE is in the OOS state are possible.

A first such arrangement may include an implicit connection release. Using synchronized timers both at NW and UE, both the entities can release the connection synchronously, thereby avoiding the two RACHs. In this method synchronized timer(s) are maintained at both UE and NW. These timers are started/re-started at every Tx/Rx at both UE and NW. As the Tx at UE and Rx at NW and vice versa happen at the same system frame number (SFN) and sub frame number, the timer(s) at UE and NW will be synchronized.

When the data activity stops these timer(s) run to expiry. At the expiry of the timer(s) both UE and NW will release the connection. In order to avoid any race conditions due to re-transmissions UE will release the connection later than the NW. The time difference between UE releasing the connection and NW releasing the connection is maintained by a guard timer. The synchronized timer(s) and the guard timer used in this process can either be static or negotiated per connection.

Note that this arrangement may be used while a UE is in uplink out-of-sync phase and/or while a UE is in uplink in-sync phase. For example, such an arrangement may reduce the signaling overhead performed between a UE and an eNB to release the UE's RRC connection whether the UE is in-sync or out-of-sync, and/or it may be simpler for infrastructure vendors and/or device vendors to implement such an arrangement such that it is in effect both when a UE is in-sync and when a UE is out-of-sync.

A second such arrangement may include using a paging message to release the RRC connection. The UE can be identified by way of its C-RNTI.

As a third such arrangement, instead of sending a PDCCH Order, the NW can send the RRC connection release message directly. Using this, the UE can release the connection and not send either a PUCCH ACK or an RLC ACK.

As a fourth such arrangement, the UE may perform the first RACH (e.g., a contention free RACH) with a PDCCH order from the NW to transition the UE into UL INS. Once the UE is UL INS, the NW can give an UL grant at an offset from the point of sending connection release to the UE. The UE may wait for this UL grant and send the UL RLC ACK when the UL grant is received.

As a fifth such arrangement, the UE may perform the first RACH (e.g., a contention free RACH) with a PDCCH order from the NW to transition the UE into UL INS. Once that RACH is successful, along with the connection release message, the NW can reconfigure the SR resources using which the UE will be able to send the UL RLC ACK and complete the procedure.

As a sixth such arrangement, the UE may perform the first RACH (e.g., a contention free RACH) with a PDCCH order from the NW to transition the UE into UL INS. At the completion of the RACH, the NW may be confident that the UE is reachable and may send the connection release to UE. At the reception of a UL HARQ ACK from the UE, the NW can confirm that the UE has received the connection release and complete the procedure. In other words, at this stage both the UE and the NW can complete the procedure instead of UE further sending the UL RLC ACK for connection release message.

As a seventh such arrangement, the NW can send the RRC connection release message directly to the UE instead of triggering a PDCCH order for a RACH. Along with the connection release message, the NW can also configure SRS resources for the UE. The UE can TX SRS using the SRS resources and the NW may be able to determine the timing adjustment for the UE based on this. Once this timing adjustment is obtained, the NW can provide a TAC to the UE, and later provide an UL grant for the UE to send an UL RLC ACK in response to the connection release message.

As another characteristic of the OOS state, it may be the case that a UE releases all the PUCCH/SR resources. Thus, in this phase, if the UE has to send any data in UL, it generally has to start by performing a RACH procedure. As previously noted, RACH procedures may be more costly in terms of power consumption than remaining INS, and may also lead to more delay then being INS when starting uplink data communication.

However, if a UE were to remain in the INS phase even in times of sparse resource usage, this could represent a substantial burden on base station (e.g., eNB) PUCCH/SR resources, such that there might not be sufficient such resources for all the UEs in the network. Accordingly, the following techniques for efficient sparse network resource usage that take the above considerations into account are proposed.

As one possibility, the UE may be able to remain in the UL INS phase with long DRX cycles (e.g., 1.28 sec). While being in such a long DRX cycle, SR resources may be sparsely allocated to the UE, such as one SR per DRX cycle.

While current specification documents do not allow the SR resources to be this sparse (e.g., the max periodicity that is possible according to the table illustrated as FIG. 10 is 80 ms), specification changes (e.g., to create one or more new SR configuration indices, such as indices at DRX cycle periodicities such as 640 ms or 1280 ms) or proprietary implementations (e.g., such as allowing a base station to configure a UE to use one of the configurations illustrated in FIG. 10 but restrict it to using the resources only in specific SFN, sub frames to effectively provide one SR per DRX cycle) may be used to provide such sparse SR resource allocations.

Additionally, the base station may stop or reduce the frequency of sending TA update commands to the UE. If the base station decides to stop sending the TA commands, then UE will use the last received TAC for the next transmission.

As another possibility, the UE may be able to remain in UL OOS phase with long DRX cycles, and to retain (e.g., at least while being in a long DRX cycle) allocated SR resources while in the OOS phase. The retained SR resources may be sparse (e.g., one per DRX cycle), such as previously discussed.

In this case, the base station may not update the TAC in this location after the UE enters UL OOS. If there is any data in UL, UE will send a SR using the last received TAC to determine its timing offset. Note that as the timing offset may change if UE is in mobility, the UE may restrict using the last received TAC to scenarios when its mobility state is static or semi static, and may perform a RACH procedure (e.g., to ensure proper timing alignment) otherwise.

A further possibility may occur, in which the UE is either in UL INS or OOS phase and has released any UL resources. In the duration in which UL resources are released, the base station may send an uplink grant to UE occasionally (e.g., at every OnDuration of the CDRX cycle), e.g., to check if there is any data. If there is any data, the UE may respond with its buffer status report (BSR) using the last received TAC to determine its timing offset. As previously described, as the timing offset may change if UE is in mobility, the UE may restrict using the last received TAC to scenarios when its mobility is static or semi static, and may perform a RACH procedure otherwise.

Note that the various features described in the present disclosure may be implemented individually or in any combination, as desired.

In the following further exemplary embodiments are provided.

One set of embodiments may include a method, comprising: by a wireless user equipment (UE) device: establishing a radio resource control (RRC) connection with a base station of a cellular network; initiating a connection release timer for the RRC connection at the UE device; determining that the connection release timer has expired; releasing the RRC connection based on determining that the connection release timer has expired.

According to some embodiments, releasing the RRC connection does not include receiving a RRC connection release message or transmitting any acknowledgement messages in response to the RRC connection release message.

According to some embodiments, the connection release timer for the RRC connection at the UE device is synchronized with a connection release timer for the RRC connection at the base station.

According to some embodiments, the method further comprises: receiving configuration settings for the connection release timer for the RRC connection from the base station, wherein the connection release timer for the RRC connection at the UE device operates according to the configuration settings received from the base station.

According to some embodiments, the method further comprises: re-starting the connection release timer at each data communication between the UE device and the base station.

According to some embodiments, the base station is also configured to release the RRC connection based on determining that a connection release timer for the RRC connection at the base station has expired, wherein the UE is configured to release the RRC connection after the base station releases the RRC connection.

According to some embodiments, the method further comprises: initiating a guard timer associated with expiration of the connection release timer; and releasing the RRC connection after expiration of the guard timer.

According to some embodiments, initiating a connection release timer for the RRC connection at the UE device, determining that the connection release timer has expired, and releasing the RRC connection based on determining that the connection release timer has expired are performed by the UE device based at least in part on a first feature or group of features being enabled.

According to some embodiments, the first feature or group of features are associated with the cellular network being aware of one or more active applications and/or types of active applications of the UE device.

Another set of embodiments may include a method, comprising: by a wireless user equipment (UE) device: establishing a radio resource control (RRC) connection with a base station of a cellular network; receiving a paging message from the base station indicating to release the RRC connection; and releasing the RRC connection based on the paging message indicating to release the RRC connection.

Yet another set of embodiments may include a method, comprising: by a wireless user equipment (UE) device: establishing a radio resource control (RRC) connection with a base station of a cellular network; receiving a RRC connection release message from the base station indicating to release the RRC connection; and releasing the RRC connection without sending an acknowledgement message in response to the RRC connection release message.

Still another set of embodiments may include a method, comprising: by a wireless user equipment (UE) device: establishing a radio resource control (RRC) connection with a base station of a cellular network; transitioning to an out-of-sync state with respect to the RRC connection with the base station; receiving an indication to perform a random access procedure to gain timing synchronization with the base station; receiving a RRC connection release message from the base station indicating to release the RRC connection; receiving an uplink grant associated with the RRC connection release message; and transmitting a radio link control (RLC) acknowledgement message in response to the RRC connection release message using the uplink grant.

A further set of embodiments may include a method, comprising: by a wireless user equipment (UE) device: establishing a radio resource control (RRC) connection with a base station of a cellular network; transitioning to an out-of-sync state with respect to the RRC connection with the base station; receiving an indication to perform a random access procedure to gain timing synchronization with the base station; receiving a RRC connection release message from the base station indicating to release the RRC connection; receiving scheduling request resources along with the RRC connection release message; transmitting a scheduling request using the scheduling request resources based on receiving the RRC connection release message; receiving an uplink grant in response to the scheduling request; and transmitting a radio link control (RLC) acknowledgement message in response to the RRC connection release message using the uplink grant.

According to some embodiments, the random access procedure is a contention free or contention based random access procedure.

A still further set of embodiments may include a method, comprising: by a wireless user equipment (UE) device: establishing a radio resource control (RRC) connection with a base station of a cellular network; transitioning to an out-of-sync state with respect to the RRC connection with the base station; receiving an indication to perform a random access procedure to gain timing synchronization with the base station; receiving a RRC connection release message from the base station indicating to release the RRC connection; transmitting a hybrid automatic repeat request (HARQ) acknowledgement in response to the RRC connection release message, and releasing the RRC connection without sending a radio link control (RLC) acknowledgement message in response to the RRC connection release message.

A yet further set of embodiments may include a method, comprising: by a wireless user equipment (UE) device: establishing a radio resource control (RRC) connection with a base station of a cellular network; receiving timing alignment information from the base station; determining that a timing alignment timer has expired; and performing an uplink communication after the timing alignment timer has expired using previously received timing alignment information.

According to some embodiments, the method further comprises: determining a mobility state of the UE device; wherein the UE device is configured to perform the uplink communication after the timing alignment timer has expired using previously received timing alignment information if the UE device is in a first mobility state associated with stationary or semi-stationary status, wherein the UE device is configured to perform a random access procedure to obtain timing alignment prior to performing uplink communication after the timing alignment timer has expired if the UE device is in a second mobility state associated with mobile status.

According to some embodiments, the method further comprises: retaining scheduling request (SR) resources after the timing alignment timer has expired; and using the SR resources retained after the timing alignment timer has expired to perform the uplink communication.

According to some embodiments, the method further comprises: receiving an uplink grant from the base station during a connected mode discontinuous reception (C-DRX) on-duration after the timing alignment timer has expired; using the uplink grant to perform the uplink communication after the timing alignment timer has expired using the previously received timing alignment information.

Another set of embodiments may include a wireless user equipment (UE) device, comprising: a radio; and a processing element; wherein the radio and the processing element are configured to perform any of the methods of the preceding examples.

Yet another set of embodiments may include a method, comprising: by a base station (BS): establishing a radio resource control (RRC) connection with a wireless user equipment (UE) device; initiating a connection release timer for the RRC connection; determining that the connection release timer has expired; and releasing the RRC connection based on determining that the connection release timer has expired.

According to some embodiments, the BS does not transmit a RRC connection release message to the UE device as part of releasing the RRC connection.

According to some embodiments, the BS indicates to the UE device to release the RRC connection using a paging message.

According to some embodiments, the BS transmits a RRC connection release message to the UE device as part of releasing the RRC connection, wherein the BS releases the RRC connection even without receiving an acknowledgement message in response to the RRC connection release message.

According to some embodiments, releasing the RRC connection further comprises, if the UE device is out-of-sync when the connection release timer has expired: indicating to the UE device to perform a random access procedure to gain timing synchronization with the base station; providing a RRC connection release message to the UE device; providing an uplink grant to the UE device based on providing the RRC connection release message to the UE device; and receiving a radio link control (RLC) level acknowledgment to the RRC connection release message from the UE device using the uplink grant.

According to some embodiments, releasing the RRC connection further comprises, if the UE device is out-of-sync when the connection release timer has expired: indicating to the UE device to perform a random access procedure to gain timing synchronization with the base station; providing a RRC connection release message to the UE device; providing scheduling request resources to the UE device based on providing the RRC connection release message to the UE device; receiving a scheduling request from the UE device; providing an uplink grant to the UE device in response to the scheduling request; and receiving a radio link control (RLC) level acknowledgment to the RRC connection release message from the UE device using the uplink grant.

According to some embodiments, releasing the RRC connection further comprises, if the UE device is out-of-sync when the connection release timer has expired: indicating to the UE device to perform a random access procedure to gain timing synchronization with the base station; providing a RRC connection release message to the UE device; receiving a hybrid automatic repeat request (HARQ) acknowledgement to the RRC connection release message from the UE device; and determining that the UE device has received the RRC connection release message at a radio link control layer of the base station based on the HARQ acknowledgement.

Still another set of embodiments may include a method, comprising: by a base station (BS): establishing a radio resource control (RRC) connection with a wireless user equipment (UE) device; providing timing alignment information to the UE device; determining that a timing alignment timer associated with the UE device has expired; and receiving an uplink communication from the UE device after the timing alignment timer has expired.

According to some embodiments, the UE device retains allocated scheduling request (SR) resources after the timing alignment timer associated with the UE device has expired, and the method further comprises: receiving a SR from the UE device after the timing alignment timer associated with the UE device has expired; and providing an uplink grant to the UE device after the timing alignment timer associated with the UE device has expired in response to the SR; wherein the uplink communication is performed using the provided uplink grant.

According to some embodiments, the method further comprises: providing an uplink grant to the UE device during a connected mode discontinuous reception (C-DRX) on-duration after the timing alignment timer has expired; wherein the uplink communication is performed using the provided uplink grant.

A further set of embodiments may include a cellular base station (BS), comprising: a radio; and a processing element; wherein the radio and the processing element are configured to perform any of the methods of the preceding examples.

Another set of embodiments may include a non-transitory computer accessible memory medium comprising program instructions which, when executed at a device, cause the device to implement any of the methods of any of the preceding examples.

A still further set of embodiments may include a computer program comprising instructions for performing any of the methods of any of the preceding examples.

Yet another set of embodiments may include an apparatus comprising means for performing any or all of the method elements of any of the preceding examples.

A yet further set of embodiments may include an integrated circuit configured to perform any of the method elements of any of the preceding examples Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
by a wireless user equipment (UE) device:
establishing a radio resource control (RRC) connection with a base station of a cellular network;
receiving timing alignment information from the base station;
determining that a timing alignment timer has expired; and
performing an uplink communication after the timing alignment timer has expired using previously received timing alignment information.

2. The method of claim 1, wherein the uplink communication is performed in previously configured resources.

3. The method of claim 2, wherein the uplink communication is performed in retained scheduling request resources.

4. The method of claim 1, wherein the uplink communication is according to a previously received uplink grant.

5. The method of claim 4, wherein the uplink grant was received during a connected mode discontinuous reception (C-DRX) ON duration.

6. The method of claim 4, wherein the uplink communication is performed without performing a random access channel RACH procedure after the timing alignment timer has expired.

7. The method of claim 1, wherein the uplink communication is performed in periodically occurring resources.

8. An apparatus, comprising:
one or more processors, wherein the one or more processors are configured to cause a wireless user equipment (UE) device to:
establish a radio resource control (RRC) connection with a base station of a cellular network;
receive timing alignment information from the base station;
determine that a timing alignment timer has expired; and
perform an uplink communication after the timing alignment timer has expired using previously received timing alignment information.

9. The apparatus of claim 8, wherein the uplink communication is performed in previously configured resources.

10. The apparatus of claim 9, wherein the uplink communication is performed in retained scheduling request resources.

11. The apparatus of claim 8, wherein the uplink communication is according to a previously received uplink grant.

12. The apparatus of claim 11, wherein the uplink grant was received during a connected mode discontinuous reception (C-DRX) ON duration.

13. The apparatus of claim 11, wherein the uplink communication is performed without performing a random access channel RACH procedure after the timing alignment timer has expired.

14. The apparatus of claim 8, wherein the uplink communication is performed in periodically occurring resources.

15. A wireless user equipment device (UE), comprising:
wireless communication circuitry; and
one or more processors coupled to the wireless communication circuitry, wherein the one or more processors are configured to cause the UE to:

establish a radio resource control (RRC) connection with a base station of a cellular network;

receive timing alignment information from the base station;

determine that a timing alignment timer has expired; and perform an uplink communication after the timing alignment timer has expired using previously received timing alignment information.

16. The UE of claim 15, wherein the uplink communication is performed in previously configured resources.

17. The UE of claim 16, wherein the uplink communication is performed in retained scheduling request resources.

18. The UE of claim 15, wherein the uplink communication is according to a previously received uplink grant.

19. The UE of claim 18, wherein the uplink grant was received during a connected mode discontinuous reception (C-DRX) ON duration.

20. The UE of claim 15, wherein the uplink communication is performed without performing a random access channel RACH procedure after the timing alignment timer has expired.

* * * * *